United States Patent [19]

Kulischenko et al.

[11] 4,366,768
[45] Jan. 4, 1983

[54] POWER STEERING DIRECTION SENSOR

[75] Inventors: Walter Kulischenko, East Brunswick, N.J.; Philip E. Bloomfield, Bala Cynwyd; Richard A. Ferren, Ambler, both of Pa.

[73] Assignee: Pennwalt Corporation, Philadelphia, Pa.

[21] Appl. No.: 385,735

[22] Filed: Jun. 7, 1982

Related U.S. Application Data

[63] Continuation-in-part of Ser. No. 183,548, Sep. 2, 1980, abandoned.

[51] Int. Cl.³ .................................. B63H 25/00
[52] U.S. Cl. .......................... 114/144 E; 244/236; 310/318; 180/79.1
[58] Field of Search ............ 310/311, 314, 318, 319, 310/323, 324, 800; 74/388; 114/144 R, 144 E; 244/236, 228, 227; 180/79.1

[56] References Cited

U.S. PATENT DOCUMENTS

| 2,164,638 | 7/1939 | Broeze et al. | 310/318 |
| 2,848,056 | 8/1958 | Herbenar | 91/186 |
| 3,167,667 | 1/1965 | Lukso | 244/236 |
| 3,578,270 | 5/1971 | Ellis | 244/236 |
| 4,046,005 | 9/1977 | Goroski | 244/236 |

FOREIGN PATENT DOCUMENTS

| 699679 | 12/1964 | Canada | 114/144 R |
| 6603583 | 9/1967 | Netherlands | 114/144 E |

OTHER PUBLICATIONS

"Electromotional Device Using PVF₂ Multilayer Bimorph", by Toda et al., The Transactions of the IECE of Japan, vol. E 61, No. 7, Jul. 1978.

*Primary Examiner*—Trygve M. Blix
*Assistant Examiner*—Thomas J. Brahan

[57] ABSTRACT

A plastic material, preferably polyvinylidene fluoride (PVDF) film, made highly piezoelectric by known methods, is placed in a sensor unit structure wherein pressure is exerted against the piezoelectric film by means of rotation of the steering wheel of the boat or vehicle to thereby cause the piezoelectric film to generate electric signals which are used in controlling the rpm of a low-inertia, instantaneously reversible steering power assist motor. The rpm of the motor is substantially proportional to the input electric signals, which, in turn, are determined by, and responsive to, the degrees of rotation and speed of rotation of the steering wheel. The direction of rotation of the steering wheel determines the direction of steering assist, i.e., to the left or right. Available torque of the motor however is substantially inversely proportional to rpm of the engine propelling the boat or vehicle.

23 Claims, 12 Drawing Figures

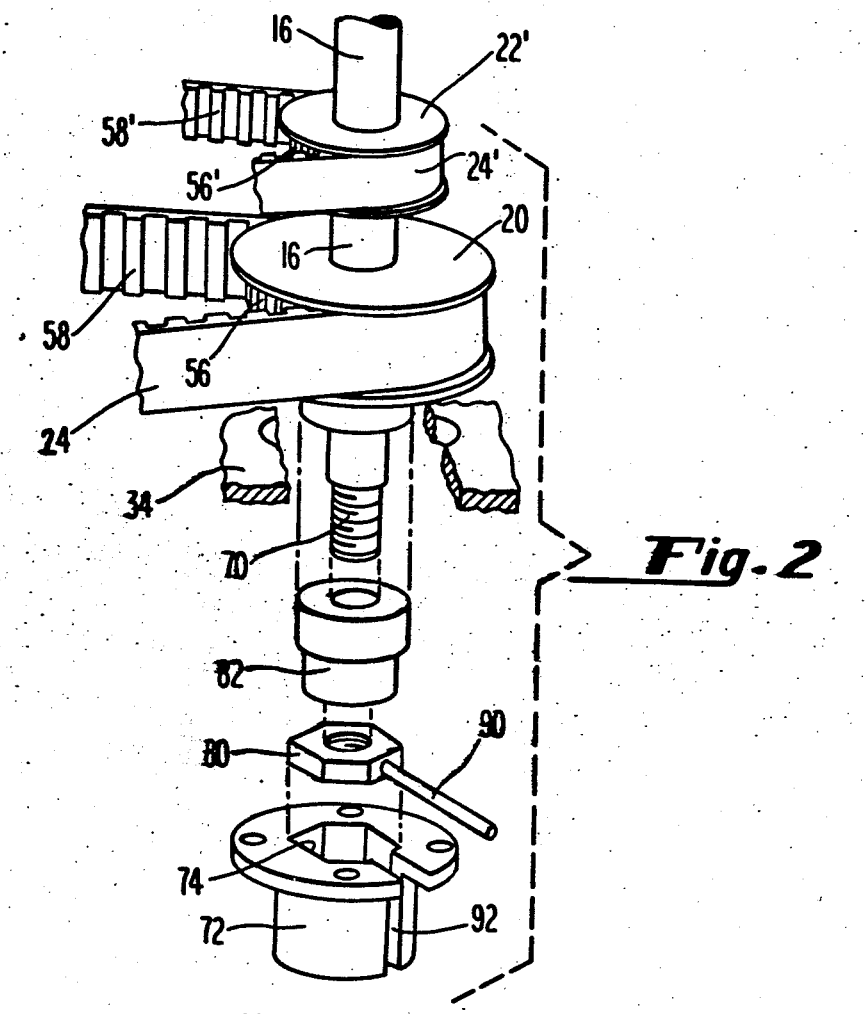
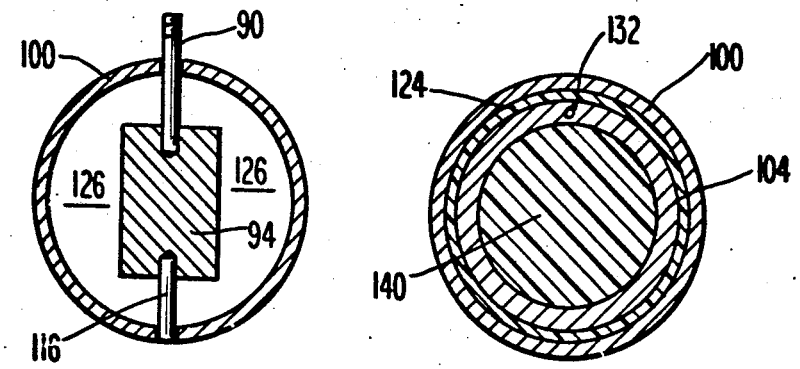

PIEZOELECTRIC SIGNAL VOLTAGE OUTPUT FROM PVDF

AVAILABLE TORQUE FROM STEERING POWER ASSIST MOTOR

POWER STEERING DIRECTION SENSOR

This application is a continuation-in-part of our co-pending application for "Power Steering Direction Sensor", Ser. No. 183,548, filed Sept. 2, 1980, and assigned to the assignee hereof, now abandoned.

STATEMENT OF THE INVENTION

This invention relates to power steering and more particularly concerns a sensor unit including plastic film piezoelectric elements therein for controlling rpm of a steering power assist motor.

BACKGROUND AND SUMMARY OF THE INVENTION

In an electrical assist steering system, it is imperative that the steering power assist motor remain inactivated when the steering wheel is not being turned. Conversely, the instant the steering wheel is turned, even slightly in either direction of rotation, the power assist motor should become energized to assist in the steering of the vessel or vehicle, to the left or to the right.

The present invention contemplates a steering system wherein the steering power assist motor is speed and direction responsive to electric signals fed thereinto. More specifically, the electric signals are generated by means of pressure being exerted against wafers or film of a suitable material preferably polyvinylidene fluoride, which has been prepared by known methods to be highly piezoelectric. These electric signals are generated in response to rotation of the steering wheel as well as the speed of rotation thereof. Available torque of the power assist motor is substantially inversely proportional to the rpm of the engine which is propelling or driving the vessel or vehicle.

While the present invention will be described hereinafter with reference to marine vessels, it is not intended that the invention be so limited. The piezoelectric elements of the sensor units are referred to hereinafter as wafers, films, or elements.

BRIEF DESCRIPTION OF THE DRAWINGS

FIG. 2 is an exploded perspective view of a portion of the mechanism which cooperates with the sensor unit of FIG. 1.

FIGS. 4 and 5 are sectional views taken along lines 4—4 and 5—5 respectively of FIG. 3.

DETAILED DESCRIPTION OF THE INVENTION

Figure 1:
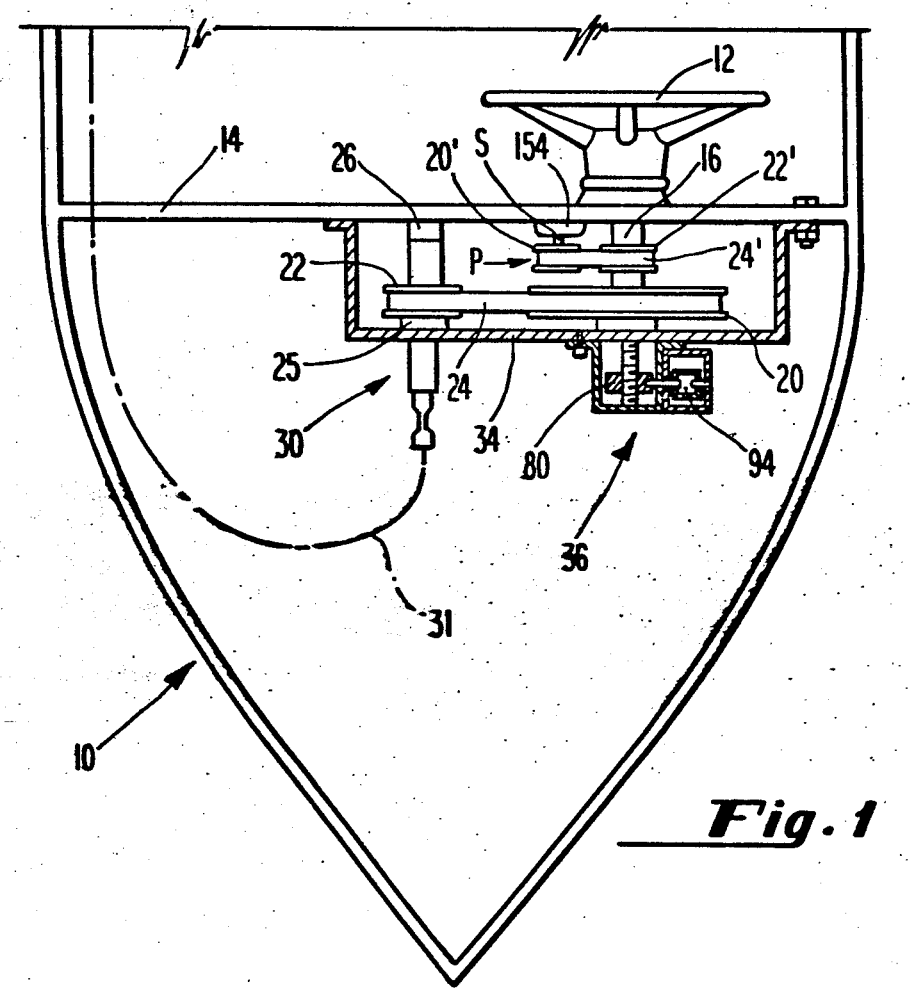
FIG. 1 is a plan view, partially sectioned, of a portion of a marine vessel to which the sensor unit of the present invention is attached, and indicating a typical location therefor.

In FIG. 1, a boat 10 includes a manually operated steering wheel 12 which may be conveniently mounted to dashboard 14. Steering wheel shaft 16 is connected by conventional means to a driver pulley 20 such that one revolution of steering wheel 12 produces a similar revolution of the driver pulley. Driver pulley 20 causes driven pulley 22 to rotate therewith by virtue of a timing belt 24 operably engaged therebetween. Driven pulley 22 is provided with a smaller diameter than driver pulley 20, and thus, a single revolution of the driver pulley will produce a plurality of revolutions of the driven pulley. In the embodiment shown, one complete revolution of steering wheel 12, or driver pulley, 20, will cause 4 revolutions of driven pulley 22. The ratio of diameters of the pulleys to achieve these values, or any desired values, is readily calculable and is not stated herein.

One end of a shaft 25 of driven pulley 22 is rotatably mounted through dashboard 14 by a suitable bearing 26, for example. The other end of shaft 25 of driven pulley 22 is connected to rotatable flexible shaft assembly 30, the rotatable flexible shaft being shown by broken line 31, which rotatable flexible shaft 31 transmits torque from shaft 25 to a ball screw cylinder (not shown), for example, which converts rotary motion from shaft 31 to linear motion, which linear motion is transmitted to an output member (not shown) for controlling steering of the boat 10, as shown and described in U.S. Pat. No. 4,173,937 to Kulischenko et al. Shaft 25 is connected to rotatable flexible shaft 31 by conventional means. A housing 34, or suitable shrouding member, may enclose the pulley-timing belt mechanism to protect it from dirt, moisture, and the like. The piezoelectric sensor unit for providing electrical signals for controlling the steering power assist motor is indicated at 36. The pulley-belt arrangement and sensor unit 36 will normally be provided commercially as a self-contained unit having steering wheel 12 operably mounted thereto, which unit may be conveniently screw mounted to dashboard 14. Suitable means are provided for connecting shaft 25 to the rotatable flexible shaft assembly.

Steering power assist motor 154 is secured to dashboard 14 and may readily be contained within housing 34. Shaft S of motor 154 assists rotation of steering wheel shaft 16 through another pulley-timing belt arrangement P, interconnecting output shaft S of motor 154 with steering wheel shaft 16.

In FIG. 2, driver pulley 20 is provided with spaced teeth 56, as is driven pulley 22. Teeth 56 coact with spaced indentations 58 on timing belt 24. Similarly, pulley-timing belt arrangement P includes a driver pulley 20' (FIG. 1) and driven pulley 22' of similar diameter with a timing belt 24' interconnected therebetween. Driven pulley 22' and driver pulley 20' are provided with an equal number of spaced teeth 56' which coact with spaced indentations 58' on timing belt 24'.

Steering wheel shaft 16 is provided with an externally threaded lug 70 having its inner end substantially flush with the exposed surface of housing 34 and its outer end projecting therethrough. A cap member 72 is provided with an internal smooth bore 74, preferably hexagonal. Travelling nut 80, similarly hexagonal, is internally threaded for receiving lug 70. Thus, rotation of shaft 16, and hence lug 70, causes nut 80 to travel within smooth bore 74. The threads of lug 70 are so pitched that nut 80, when positioned midway the length of lug 70 will have a total unobstructed travel of approximately 0.6", i.e., about 0.2" for each complete revolution of steering wheel 12.

Bushing 82 permits lug 70 to rotate freely in housing 34 while another bushing (not shown) permits shaft 16 to similarly rotate in dashboard 14.

Travelling nut 80 is provided with a pin 90 threadedly mounted thereinto and extending laterally therefrom. Cap 72 is provided with a vertical slot 92 permitting pin 90 to travel therealong when shaft 16 is rotated.

Figure 3:
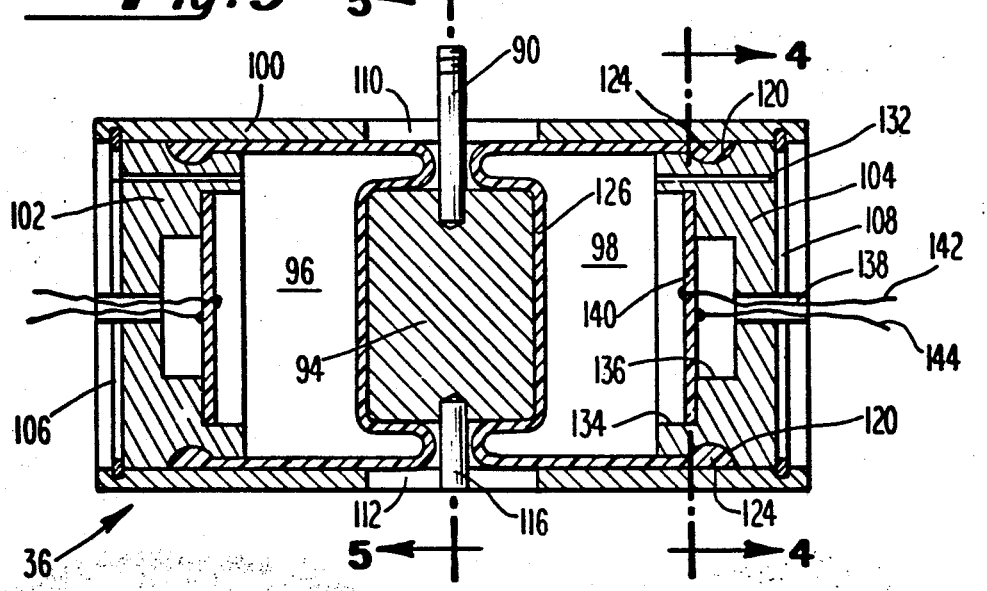
FIG. 3 is an axial sectional view of the sensor unit of FIG. 1.

In FIG. 3, pin 90 is screw-threadedly affixed to a cylindrical piston 94, or force-fitted into a bore therein. Thus, as nut 80 travels within slot 92, cylindrical piston 94 is caused to travel towards left chamber 96 or right chamber 98, both confined within open-ended cylindrical casing 100, which is provided at its ends with plug members 102 and 104, removably locked into casing 100 by means of bowed retaining rings 106 and 108 respectively. The plugs form air-tight seals with interior wall of casing 100 by suitable cements or adhesives applied therebetween.

Figure 6:
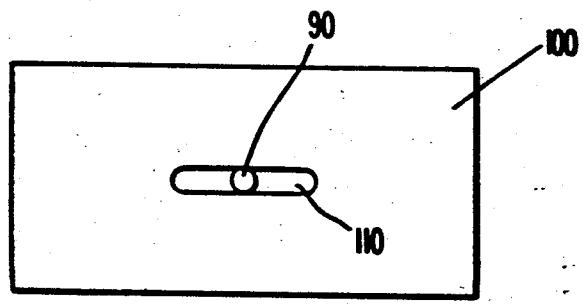
FIG. 6 is a plan view of the sensor unit illustrated in FIG. 3.

Casing 100 is provided with a pair of diametrically opposed slots 110 and 112 (FIG. 6). Slot 110 substantially defines the extent of travel of pin 90, i.e., approximately 0.6" as aforementioned. Another pin 116, aligned with pin 90, extends from cylindrical piston 94, and serves as a bearing support therefor as pin 116 travels within slot 112.

Plug members 102 and 104, and elements associated therewith, are substantially identical. Hence, description will proceed hereinafter with respect to the right half of sensor unit 36, as FIG. 3 is viewed, it being understood that the description is equally applicable to the other half.

Plug member 104 is provided with a recessed annulus 120 which serves to capture bead 124 of a resilient rolling diaphragm 126. Plug member 104 includes an orifice 132, suitably 1 to 16 mils in diameter, depending upon size of the sensor unit, type vessel and its steering system, which orifice aids in controlling pressure within chamber 98 and for egress or ingress of air through the orifice when cylindrical piston 94 is caused to move to the left or right.

A pair of bores of diminishing diameter 134 and 136 is centrally disposed in plug 104, the latter bore communicating with an open end of casing 100 through a central passageway 138.

Casing 100, plug members 102 and 104, and pins 90 and 116 may conveniently be aluminum.

A film, wafer or element 140, preferably polyvinylidene fluoride, referred to hereinafter as PVDF, suitably Kynar, a trademark product of Pennwalt Corp., Philadelphia, assignee of the present invention, is secured by cement or adhesive within bore 134. PVDF is known to have piezoelectric properties. Highly piezoelectric PVDF elements may be prepared in accordance with the teachings disclosed in U.S. Pat. No. 3,931,446 and U.S. Pat. No. 4,055,878, which elements are suitable for use in the practice of the present invention. It is understood, of course, that wafers 140 are provided on both surfaces thereof with a suitable metallized coating, conventionally applied. An electroconductive coating on one surface only of wafers 140 is also contemplated by the present invention.

An electrical conductor 142 is attached to an outer surface of PVDF wafer 140, as shown in FIG. 3, and led through passageway 138 to an amplifier 150 (FIG. 7), along with ground wire 144, attached to an opposite face of wafer 140. Alternatively, a ground connection can readily be taken from plug 104 which is in direct contact with wafer 140.

Numeral 140 of FIG. 3 may also designate a pressure transducer, having a sensitivity from about 0 to 30 psi, but, of course, not limited thereto. While the description of the invention is directed principally to piezoelectric elements, pressure transducers are equally operable in the sensor unit of FIG. 3. Typically, the pressure transducer comprises four-active-element piezoresistive bridges. When pressure is applied against the pressure tranducer, a differential output voltage proportional to that pressure is produced.

Thus, as steering wheel 12 is rotated to the right, for example, cylindrical piston 94 moves to the right to decrease the volume within chamber 98 to increase the pressure therewithin. A small portion of the air will escape through orifice 132. Pressure increases within right chamber 98 to cause piezoelectric wafer 140, or, in lieu thereof, a pressure transducer 140, to generate millivoltage signals 152 across wires 142 and 144, notwithstanding that steering wheel 12 may be rotated slowly through a fraction of one degree only. These signals 152 are suitably amplified by the amplifier 150 and the amplified signals fed into a conventional microprocessor 153 for controlling steering power assist motor 154. Amplifiers 150 may be operational-type amplifiers, high-impedance, suitably RCA type CA 3021, 3041, or 3061.

Microprocessor 153 detects the change in state of input signals from sensors and acts on this information to produce desired output signals to drive loads such as power assist motor 154.

Thus, microprocessor 153 is capable of receiving the amplified signals (signals are generated by the piezoelectric elements) to cause the output shaft of power assist motor 154 to rotate in a CW or CCW direction at a speed in accordance with the degree of rotation and speed of rotation of the steering wheel. Rotating the steering wheel rapidly, for example, causes a greater pressure to be exerted against one of the piexoelectric elements, i.e., the left or right, depending upon the direction the wheel is turned, where rapid turning causes greater millivoltage signals to be generated by the piezoelectric elements. Since the speed of shafts S of motor 154 is relatively low, from about 28 to 45 rpm when its gear ratio is 80:1 to 50:1, for example, or less than 1 revolution per second, there is little chance that the steering wheel will be jerked from the hands of the operator.

Power assist motor 154 generates variable output speeds of shaft S in direct proportion to the dc voltage applied at its input. Because of low armature inertia, mechanical response of motor 154 is extremely fast, and may be started and stopped instantaneously by voltage control alone applied to its input, thus eliminating any need for clutches and brakes. Motor 154 is typically provided with a built-in step-down gear ratio of 50:1, for example, resulting in an output maximum speed of shaft S of 45 rpm. In certain applications, motor 154 may be provided with a built-in step-down gear ratio of 80:1, resulting in an output speed of only 28 rpm for shaft S, as abovementioned.

Thus, motor 154 is responsive to rotation of steering shaft 16 to assist the operator in steering vessel 10. If wheel 12 is rotated faster or for a greater number of degrees of rotation, the instantaneous current or integrated current (charge) output respectively from the piezoelectric wafer will be proportionally increased. Of course, as abovementioned, pressure transducer 140 may be employed in lieu of the piezoelectric elements.

Conversely, if steering wheel 12 is rotated to the left, signals 155 will be generated, amplified, microprocessed and fed into motor 154 for power assist in the other direction.

Figure 7:
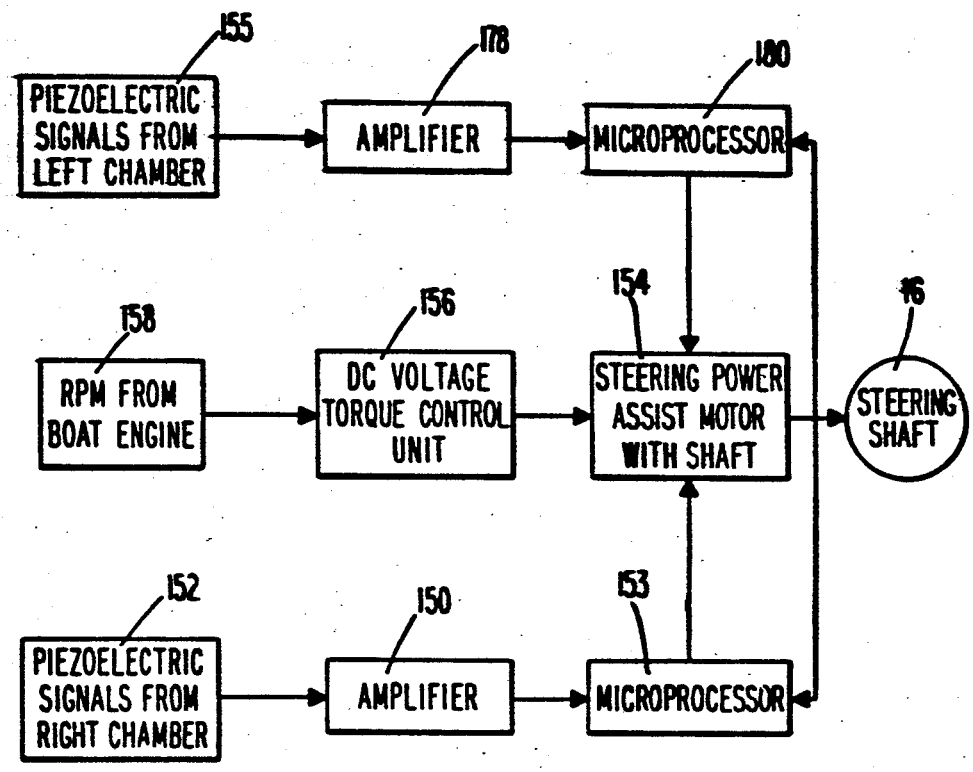
FIG. 7 is a block diagram illustrating means employed by the present invention in controlling the steering power assist motor by the generated piezoelectric signals and torque control unit.
Figure 8:
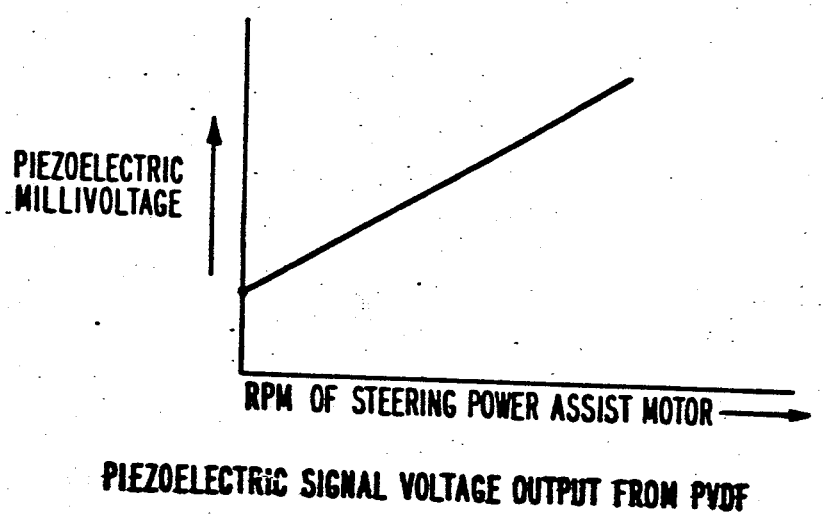
FIG. 8 is a graphical representation wherein piezoelectric charge output is plotted against rpm of the power assist motor.

As indicated broadly in FIG. 8, an increase in piezoelectric signal or charge output will increase the rpm of motor 154 through the block diagram circuitry of FIG. 7.

Figure 9:
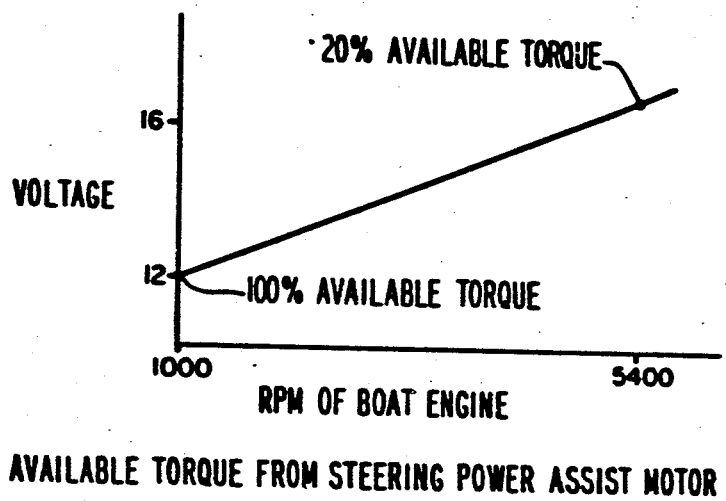
FIG. 9 graphically illustrates available torque of the power assist motor at various speeds of the boat engine.

Referring now to FIG. 9 available torque to motor 154 is controlled by a commercially available DC voltage torque control unit 156. At low speeds of boat engine 158, i.e., at approximately 1000 rpm, for example, torque control unit 156 is adjusted such that motor 154 delivers maximum available torque at 12 volts output of control unit 156. For safety reasons, when the speed of boat engine 158 is increased to about 5400 rpm, unit 156 will cause motor 154 to deliver only about 20% of its available torque. This follows, since less effort is required to steer at higher speeds, as with automobiles.

Figure 10:
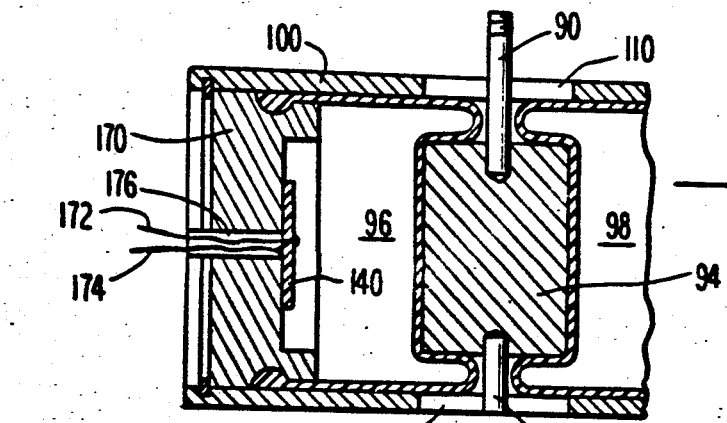
FIGS. 10 and 11 are modifications of the sensor unit illustrated in FIG. 3.

In the modification illustrated in FIG. 10, chambers 96 and 98 are air-tight. The plug members do not include orifices 132 (FIG. 3). Each plug (only left plug 170 is shown) has a piezoelectric wafer 140 adhered to the inner face thereof. Insulated conductor wires 172 and 174 are attached to the inner and outer faces of the piezoelectric wafers respectively. Ground wire 174 may be connected directly to plug 170. Conductors 172 and 174 pass through opening 176, shown enlarged for clarity, to amplifier 178, and the amplified signals fed into microprocessor 180. The absence of plug orifices and the absence of a substantially large cavity behind each piezoelectric wafer distinguishes the modification of FIG. 10 from the embodiment illustrated in FIG. 3. Piezoelectric wafers 140 need not be centrally affixed to plug member 170 and conductors 172 and 174 may be passed to amplifier 178 through suitably sealed opening other than as shown.

Figure 11:
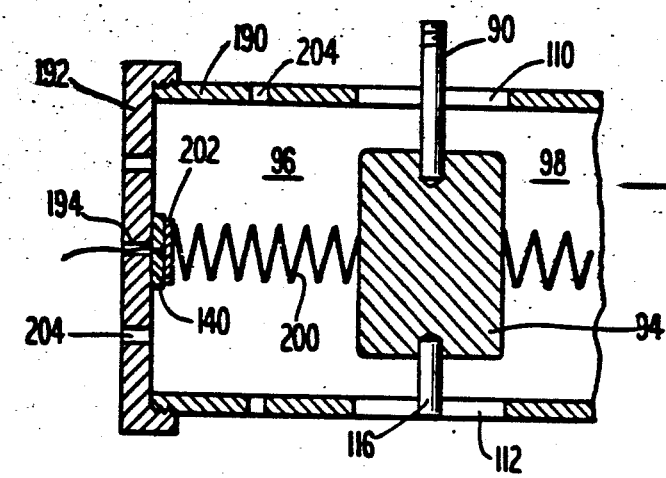

In FIG. 11, cylindrical casing 190 is threaded at its ends for receiving cap member 192 (only left cap member 192 is illustrated). Piezolectric wafer 140 is affixed interiorly of left cap member 192 for passage therethrough of insulated conductor wires which lead to the amplifier and microprocessor as aforedescribed. A suitably preloaded spring 200 is disposed between piston 94 and plate 202 which constantly exerts pressure against wafer 140. Thus, as steering wheel 12 is rotated in one direction or the other, piston 94 will be displaced accordingly to vary the pressures against wafers 140 to thereby vary the electrical outputs generated therefrom which electrical signals are conventionally processed as abovediscussed. Casing 190 and cap members 192 may optionally be provided with a plurality of openings 204 to prevent any pressure from being exerted against wafer 140 due to ambient temperature or pressure changes, or from extraneous sources although an environomentally sealed unit is preferable.

The present invention also contemplates a single chamber sensor unit wherein movement of piston 94 from a fixed point would yield additive or subtractive currents which may be conventionally amplified and microprocessed to thus control the power assist motor 154.

Each of the sensor units of FIGS. 3 and 10 is capable of providing a positive current from that chamber where pressure is increasing against the piezoelectric element therein, and against the pressure transducer of FIG. 3 if used in lieu of the piezoelectric element; and a negative current from the other chamber. The direction of rotation of the steering wheel, of course, determines which piezoelectric element (or pressure transducer) is being subjected to the increasing pressure. As is well known the negative currents may be disregarded by the microprocessor such that the positive currents only will determine the direction of power assist by motor 154. Additionally, the independent electric signals (current or charge) generated by the respective piezoelectric elements (or pressure transducers) of each sensor unit can readily be compared by the microprocessor to provide greater reliability of the sensor units.

Figure 12:
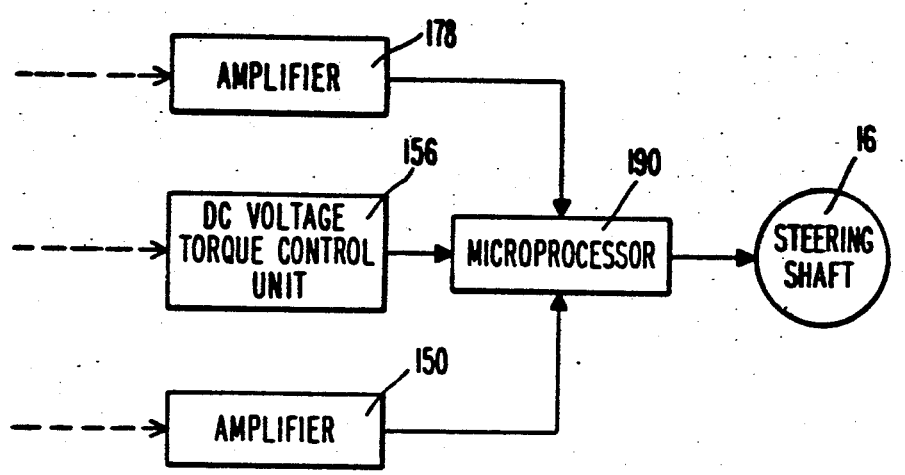
FIG. 12 is a block diagram similar to FIG. 7 illustrating alternate means of controlling the steering power assist motor.

The present invention also contemplates the use of a single microprocessor 190 (FIG. 12) wherein amplified currents and collected charges from the respective piezoelectric elements (or pressure transducers) may be fed thereinto, as well as the output from torque control unit 156. Power assist motor 154, of course, is then controlled by the single microprocessor output.

PVDF wafer 140, suitably Kynar, possesses pyroelectric as well as piezoelectric properties. Automatic temperature compensation means adjacent or within the sensor unit, may readily be achieved via suitable transistors and thermistors, well known in the industry. Further, ageing the wafer material by subjecting it to sufficiently high temperatures for improving its heat stability prior to usage thereof in the sensor unit is known and may be accomplished by conventional means.

All piezoelectric wafers, films or elements hereinabove described generated (under open circuit conditions) approximately 30 millivolts for each pound per square inch pressure applied against their surfaces per 1 mil thickness of the material. Of course, the invention is not intended to be so limited as one skilled in the art will appreciate, since piezoelectric wafers, films or elements may be fabricated to possess varying and controlled properties.

Typically, a sensor unit having an I.D. of 0.740" and wafers of PVDF having a diameter of 0.500", generated 81 picoCoulombs when the steering wheel was rotated about 45° rotation. The sensor unit included no orifices 204.

It is apparent from the description hereinabove provided that the present invention assists steering of the vessel by combining available torque of motor 154, controlled by control unit 156 in accordance with speed of engine 158, with the controlled rpm of motor 154, determined by speed of rotation and degrees of rotation of steering wheel 12. Further, when the steering wheel is not being rotated, and hence no pressure exerted against either PVDF wafer or pressure transducer, no piezoelectric signals will be generated therefrom to energize the steering power assist motor.

In further clarification of the invention, the control signals from the sensor unit illustrated in FIGS. 3 and 10 are generated by means of pneumatic pressure being applied against the sensor element where the electrical output therefrom is proportional to the pneumatic pressure applied thereagainst.

The electrical output is then amplified, and fed into a silicon controlled rectifier (SCR) control unit, or the like, (not shown) or microprocessor 180, which relays the amplified electrical output to the steering power assist motor 154, which controls the speed of rotation thereof in the turning of the steering shaft 16 in accordance with the electrical output.

The electrical output is governed by the movement and direction of rotation of the steering wheel. In the embodiment of FIG. 3, in order to discriminate between pressure changes caused by a more rapid turning of the steering wheel which requires power assist, and pressure changes partially caused by pressure leaks through orifices 132, the leak rate (controlled by the diameter of the orifices) is chosen such that the resulting pressure change will correspond to a rate of rotation of the steering wheel below the threshold required for power assist. Orifices 132 however may be infinitesimally small such that almost any rotation of the steering wheel will produce some power assist.

In FIG. 10, when the steering wheel is turned in a clockwise direction, for example, pressure within right chamber 98 is increased while simultaneously therewith, pressure in left chamber 96 is decreased, the pressure changes being identical. Thus, the electrical output from one piezoelectric wafer is of one electrical sign and the electrical output from the other wafer is of opposite sign, the signs indicating the direction of rotation of the steering wheel.

It is the rotation of the steering wheel, and hence the electrical output generated thereby, which synchronizes speed of rotation of the steering wheel with speed of rotation of the power assist motor shaft. The direction of rotation of the steering wheel, of course, governs the direction of rotation of the power assist motor.

Since the electrical output is being monitored under closed circuit conditions, the instantaneous current (which is determined by the rate of wheel rotation) and the net charge (which is determined by the amount of wheel rotation) must be stored and interpreted by the microprocessor.

Now, if the spring 200 illustrated in FIG. 11 is used, the integrated current (charge) output generated by piezoelectric wafer 140 (not the pressure transducers of FIG. 3 used in lieu of the piezoelectric wafers) is similarly proportional to the pressure applied thereagainst. Thus, if the spring is compressed to a load of about three pounds, for example, and the steering wheel then stopped and held in this position, the charge from the piezoelectric wafer's integrated current output stored on a charge amplifier is not 0 coulombs, but may be 300 picoCoulombs, for example. When the steering wheel is now turned again, it becomes necessary to interpret not only the stored charge, but also the position of the steering wheel. Thus, the microprocessor must be capable of making the following rapid decisions:

a. that the movement of the steering wheel has actually stopped. (This can be discerned by monitoring the direct current output as well as the net charge output).

b. that if movement of the steering wheel starts again (current output starts again) the initial stored charge is due to the former movement of the steering wheel.

c. that the stored charge is to be interpreted as a 0 charge and therefore the steering power assist motor 154 should respond as if "normal" initial conditions prevailed.

Reference is again made to U.S. Pat. No. 4,173,937, of Kulischenko et al, for "Remotely Actuated Marine Steering System", assigned to the same and present assignee, which steering system may be advantageously utilized by the present invention.

We claim:

1. A sensor unit for instantaneously varying rpm and direction of rotation of a steering power assist motor shaft in marine vessels and the like in response to direction of rotation and speed of rotation of a steering wheel of said vessel in conjunction with available torque from said motor, said available torque being substantially inversely proportional to rpm of engine driving said marine vessel, said sensor unit comprising
   an open-ended cylindrical casing,
   a plug member disposed at each end of said casing,
   a plastic member having piezoelectric properties disposed against each of said plug members,
   means for separating said casing into a pair of substantially identical chambers,
   means responsive to said direction and speed of rotation of said steering wheel for changing volume within said chambers whereby pressure is exerted against a face of one of said plastic members when said steering wheel is rotated in one direction and against a face of other of said plastic members when said wheel is rotated in other direction to thereby provide signals from said members for causing said motor shaft to assist steering in accordance with said changed volume.

2. The unit of claim 1 wherein said plastic members comprise polyvinylidene fluoride.

3. The unit of claim 2 wherein pressure is exerted against inner faces of said plastic members.

4. The unit of claim 3 wherein each of said plug members is removably locked in place by a retaining ring contacting inner wall of said cylindrical casing.

5. The unit of claim 3 wherein said means for separating said casing into a pair of substantially identical chambers comprises
   (a) a cylindrical piston disposed between said chambers,
   (b) a resilient rolling diaphragm confined between said piston and each of said plug members,
   said sensor unit also comprising other means for causing said piston to travel towards either of said chambers.

6. The unit of claim 5 wherein said other means comprises
   a first pin extending axially from said piston and
   a first slot provided in said casing for receiving said first pin for guiding said travel of said piston.

7. The unit of claim 6 wherein said piston is provided with a second pin aligned with said first pin and extending from other end of said piston,
   a second slot provided in said casing disposed in diametric opposition to said first slot,
   said second pin travelling along said second slot to act as a bearing support for said piston.

8. The unit of claim 7 wherein a central passageway is provided in each of said plug members for passage therethrough of electrical conductors capable of conducting electric signals from said plastic members when pressure is exerted thereagainst by travel of said piston in a direction theretowards.

9. The unit of claim 2 wherein movement of said first pin is in response to direction of rotation of said steering wheel.

10. The unit of claim 9 wherein said first pin has one end thereof secured to a travelling threaded nut which moves in a direction responsive to direction of rotation of said steering wheel.

11. The unit of claim 6 wherein each of said plug members is provided with an orifice therethrough for egress and ingress of air when volume within said chambers is changing during travel of said piston.

12. The unit of claim 11 wherein diameter of said orifices ranges between about 1 to 16 mils.

13. A sensor unit for instanteously varying rpm and direction of rotation of a steering power assist motor shaft in marine vessels and the like in response to direction of rotation and speed of rotation of a steering wheel of said vessel in conjunction with available torque from said motor, said available torque being substantially inversely proportional to rpm of engine driving said marine vessel, said sensor unit comprising
   a casing member,
   support means disposed at ends of said casing,
   a plastic film sensing element affixed to each of said support means,
   a piston disposed intermediate said ends of said casing to provide a pair of substantially identical chambers therewithin,
   a resilient rolling diaphragm confined between said piston and each of said support means, said support means and diaphragms and plastic film sensing elements providing air-tightness to said chambers,
   said sensor unit also including other means for causing said piston to travel towards either of said support means, and
   additional means responsive to said direction and speed of rotation of said steering wheel for exerting pressure agianst inner faces of said platic film sensing elements to provide signals therefrom for causing said motor shaft to assist steering in accordance with said direction and speed of rotation of said steering wheel.

14. The unit of claim 13 wherein said plastic film comprises polyvinylidene fluoride.

15. The unit of claim 14 wherein said plastic film comprises wafers.

16. The unit of claim 13 wherein
   a preloaded spring is interposed between said piston and each of said plastic film sensing elements for transmitting added pressure against one of said plastic film sensing elements upon rotation of said steering wheel in a direction to cause said added pressure and
   still other means for urging said piston to travel towards other of said plastic film sensing elements.

17. The unit of claim 16 wherein said still other means comprises
   a first pin extending axially from said piston, and
   a first slot provided in said casing for receiving said first pin for guiding said travel of said piston.

18. The unit of claim 17 wherein said piston is provided with a second pin aligned with said first pin and extending from other end of said piston,
   a second slot provided in said casing disposed in diametric opposition to said first slot,
   said second pin travelling along said second slot to act as a bearing support for said piston.

19. The unit of claim 13 wherein said other means comprises
   a first pin extending axially from said piston, and
   a first slot provided in said casing for receiving said first pin for guiding said travel of said piston.

20. The unit of claim 19 wherein said piston is provided with a second pin aligned with said first pin and extending from other end of said piston,
   a second slot provided in said casing disposed in diametric opposition to said first slot,
   said second pin travelling along said second slot to act as a bearing support for said piston.

21. The unit of claims 18 or 20 wherein said first pin has one end thereof secured to a travelling threaded nut which moves in a direction responsive to direction of rotation of said steering wheel.

22. The unit of claim 16 wherein each of said preloaded springs is disposed within a separate chamber, and
   leak means disposed in each of said chambers.

23. A sensor unit for instanteously varying rpm and direction of rotation of a steering power assist motor shaft in marine vessels and the like in response to direction of rotation and speed of rotation of a steering wheel of said vessel in conjunction with available torque from said motor, said available torque being substantially inversely proportional to rpm of engine driving said marine vessel, said sensor unit comprising
   an open-ended cylindrical casing,
   a plug member disposed at each end of said casing,
   a pressure transducer disposed against each of said plug members,
   means for separating said casing into a pair of substantially identical chambers,
   means responsive to said direction and speed of rotation of said steering wheel for changing volume within said chambers whereby pressure is exerted against a face of one of said pressure transducers when said steering wheel is rotated in one direction and against a face of other of said pressure transducers when said wheel is rotated in other direction to thereby provide signals from said transducers for causing said motor shaft to assist steering in accordance with said changed volume.

* * * * *